United States Patent
Jo (10) Patent No.: US 9,639,937 B2
(45) Date of Patent: May 2, 2017

(54) APPARATUS AND METHOD FOR DETECTING EVENT FROM PLURALITY OF PHOTOGRAPHED IMAGES

(71) Applicant: SK TELECOM CO., LTD., Seoul (KR)

(72) Inventor: Young-gwan Jo, Seongnam-si (KR)

(73) Assignee: SK TELECOM CO., LTD., Seoul (KR)

( * ) Notice: Subject to any disclaimer, the term of this patent is extended or adjusted under 35 U.S.C. 154(b) by 59 days.

(21) Appl. No.: 14/667,552

(22) Filed: Mar. 24, 2015

(65) Prior Publication Data

US 2015/0199815 A1 Jul. 16, 2015

Related U.S. Application Data

(63) Continuation of application No. PCT/KR2013/008592, filed on Sep. 25, 2013.

(30) Foreign Application Priority Data

Sep. 25, 2012 (KR) .................... 10-2012-0106797

(51) Int. Cl.
*G06K 9/00* (2006.01)
*G06T 7/00* (2017.01)
(Continued)

(52) U.S. Cl.
CPC ........ *G06T 7/0022* (2013.01); *G06K 9/00771* (2013.01); *G06T 7/254* (2017.01);
(Continued)

(58) Field of Classification Search
CPC ... G06T 7/2093; G06T 7/2053; G06T 7/0022; G06T 2210/12; G06T 2207/30232;
(Continued)

(56) References Cited

U.S. PATENT DOCUMENTS 8,570,376 B1 * 10/2013 Sharma ............... H04N 7/18
348/159
2010/0026802 A1 * 2/2010 Titus ................ G08B 13/19608
348/143
(Continued)

FOREIGN PATENT DOCUMENTS

KR  1020040079164 A  9/2004
KR  1020080030304 A  4/2008
(Continued)

OTHER PUBLICATIONS

International Search Report for PCT/KR2013/008592 dated Sep. 25, 2013.
(Continued)

*Primary Examiner* — Ali Bayat
(74) *Attorney, Agent, or Firm* — Hauptman Ham, LLP (57) ABSTRACT

An apparatus and a method for detecting an event from a plurality of captured images are disclosed. An apparatus for generating an individual event rule is provided, comprising an image receiver, an image synthesis unit, an event rule acquisition unit, an individual event rule generator and a rule transmitter. The image receiver receives multiple captured images from multiple cameras. The image synthesis unit synthesizes the multiple captured images through conversion functions corresponding to coordinate systems of the multiple cameras into a main image. The event rule acquisition unit acquires an event rule for the main image. The individual event rule generator converts the event rule through the conversion functions into individual event rules corresponding respectively to the cameras. The rule transmitter transmits the individual event rules for identifying a single event.

5 Claims, 5 Drawing Sheets

(51) Int. Cl.
H04N 7/18 (2006.01)
G06T 7/254 (2017.01)
G06T 7/292 (2017.01)
G08B 13/196 (2006.01)

(52) U.S. Cl.
CPC ............ *G06T 7/292* (2017.01); *H04N 7/181* (2013.01); *G06T 2207/30232* (2013.01); *G06T 2210/12* (2013.01); *G08B 13/19641* (2013.01)

(58) Field of Classification Search
CPC ........... G06K 9/00771; G06K 9/00785; G08B 13/19641; G08B 13/19608; G08B 13/19691; G08B 13/19697; H04N 7/181; H04N 7/18
USPC ........................................................ 382/103
See application file for complete search history.

(56) References Cited

U.S. PATENT DOCUMENTS

| | | | |
|---|---|---|---|
| 2010/0260376 A1* | 10/2010 | Cobb | G06K 9/00785 382/103 |
| 2011/0211036 A1* | 9/2011 | Tran | H04N 5/23238 348/14.08 |
| 2013/0182905 A1* | 7/2013 | Myers | H04N 7/18 382/103 |
| 2013/0265434 A1* | 10/2013 | Iwamoto | H04N 7/183 348/157 |

FOREIGN PATENT DOCUMENTS

| | | |
|---|---|---|
| KR | 1020090026937 A | 3/2009 |
| KR | 1020090035379 A | 4/2009 |
| KR | 1020090069935 A | 7/2009 |

OTHER PUBLICATIONS

Youlu Wang et al., "Cooperative Object Tracking and Composite Event Detection With Wireless Embedded Smart Cameras", IEEE Transactions on Image Processing, vol. 19, No. 10, Oct. 1, 2010, corresponding to XP011328621, 20 pages.

Huibin Wang et al., "Multi-Camera Tracking based on Information Fusion in Video Surveillance", Image and Signal Processing, IEEE, Oct. 17, 2009 corresponding to XP031555429, 5 pages.

Hamid Aghajan et al., "Preface, Chapter 18, Chapter 19" in Multi-Camera Networks: Principles and Applications, Feb. 2, 2008, Academic Press, corresponding to XP002761800, 53 pages.

Extended European Search Report dated Sep. 27, 2016 in connection with the counterpart European Patent Application No. 13840942.0-1901.

* cited by examiner

APPARATUS AND METHOD FOR DETECTING EVENT FROM PLURALITY OF PHOTOGRAPHED IMAGES

CROSS-REFERENCE TO RELATED APPLICATION

The present application is a continuation of International Patent Application No. PCT/KR2013/008592, filed Sep. 5, 2013, which is based on and claims priority to Korean Patent Application No. 10-2012-0106797, filed on Sep. 25, 2012. The disclosures of the above-listed applications are hereby incorporated by reference herein in their entirety.

TECHNICAL FIELD

The present disclosure in one or more embodiments relates to an apparatus and a method for detecting a single event from multiple captured images, by converting an event rule for a synthesized image from the multiple captured images.

BACKGROUND

The statements in this section merely provide background information related to the present disclosure and do not necessarily constitute prior art.

A video security system sets an event rule for each of installed cameras. The inventor(s) has noted that the event rule is used as a basis for detecting each and every event and to produce multiple redundant event detections even from a single object that actually causes those events. The inventor(s) has experienced that such unnecessary detections increase processing burden and time required for identifying numerous event occurrences as an actually same event.

SUMMARY

In accordance with some embodiments of the present disclosure, an apparatus for generating an individual event rule comprises an image receiver, an image synthesis unit, an event rule acquisition unit, an individual event rule generator and a rule transmitter. The image receiver is configured to receive multiple captured images from multiple cameras. The image synthesis unit is configured to synthesize the multiple captured images into a main image through conversion functions corresponding to coordinate systems of the multiple cameras. The event rule acquisition unit is configured to acquire an event rule for the main image. The individual event rule generator is configured to convert the event rule through the conversion functions into individual event rules corresponding respectively to the cameras. The rule transmitter is configured to transmit the individual event rules for identifying a single event.

In accordance with another embodiment of the present disclosure, an event detecting apparatus includes an image receiver, a rule receiver, an object-of-interest extractor, an individual event determiner, an event identifier and an event output unit. The image receiver is configured to receive multiple captured images from multiple cameras. The rule receiver is configured to receive an event rule as a basis for determining the presence or absence of a predetermined event from a synthesized image of the multiple captured images and individual event rules which are converted from the event rule through conversion functions corresponding to coordinate systems of the multiple cameras. The object-of-interest extractor is configured to extract an object-of-interest from the captured images. The individual event determiner is configured to determine whether trace information of the object-of-interest corresponds to individual events based on the individual event rules. The event identifier is configured to generate inversely converted trace information from the trace information of the object-of-interest through the conversion functions, determine whether multiple pieces of the inversely converted trace information comply with the event rule, and when the multiple pieces of the inversely converted trace information comply with the event rule, identify the object-of-interest as a single event. And the event output unit is configured to generate output information according to the identified single event.

In accordance with yet another embodiment of the present disclosure, a method for generating an individual event rule, includes receiving multiple captured images from multiple cameras; synthesizing the multiple captured images into a main image through conversion functions corresponding to coordinate systems of the multiple cameras; acquiring an event rule for the main image; generating individual event rules by converting the event rule through the conversion functions into the individual event rules corresponding respectively to the cameras; and transmitting the individual event rules for identifying a single event.

In accordance with yet another embodiment of the present disclosure, an event detecting method, includes receiving multiple captured images from multiple cameras; receiving an event rule as a basis for determining the presence or absence of a predetermined event of a synthesized image of the multiple captured images and individual event rules which are converted from the event rule through conversion functions corresponding to coordinate systems of the multiple cameras; extracting an object-of-interest from the captured images; determining an individual event by determining whether trace information of the object-of-interest corresponds to individual events based on the individual event rules; performing event identification, including generating an inversely converted trace information from the trace information of the object-of-interest through the conversion functions, determining if multiple pieces of the inversely converted trace information comply with the event rule, and if comply with the event rule, identifying the object-of-interest as a single event; and performing event output by generating output information according to the identified single event.

DETAILED DESCRIPTION

Hereinafter, at least one embodiment of the present disclosure will be described in detail with reference to the accompanying drawings. In the following description, like reference numerals designate like elements, although the elements are shown in different drawings. Further, in the following description of the at least one embodiment, a detailed description of known functions and configurations incorporated herein will be omitted for the purpose of clarity and for brevity.

Additionally, in describing the components of the present disclosure, terms like first, second, A, B, (a), and (b) are used. These are solely for the purpose of differentiating one component from another, and one of ordinary skill would understand that the terms are not to imply or suggest the substances, the order or sequence of the components. If a component is described as 'connected', 'coupled', or 'linked' to another component, one of ordinary skill in the art would understand that the components are not necessarily directly 'connected', 'coupled', or 'linked' but also are indirectly 'connected', 'coupled', or 'linked' via a third component.

Some embodiments of the present disclosure provide an apparatus and a method for detecting a single event from multiple captured images by converting an event rule for a synthesized image from the multiple captured images through conversion functions corresponding to the coordinate systems of the multiple cameras into individual event rules as a basis for determining multiple individual events, and detecting or identifying the determined multiple individual events through the predetermined conversion functions as the single event.

Figure 1:
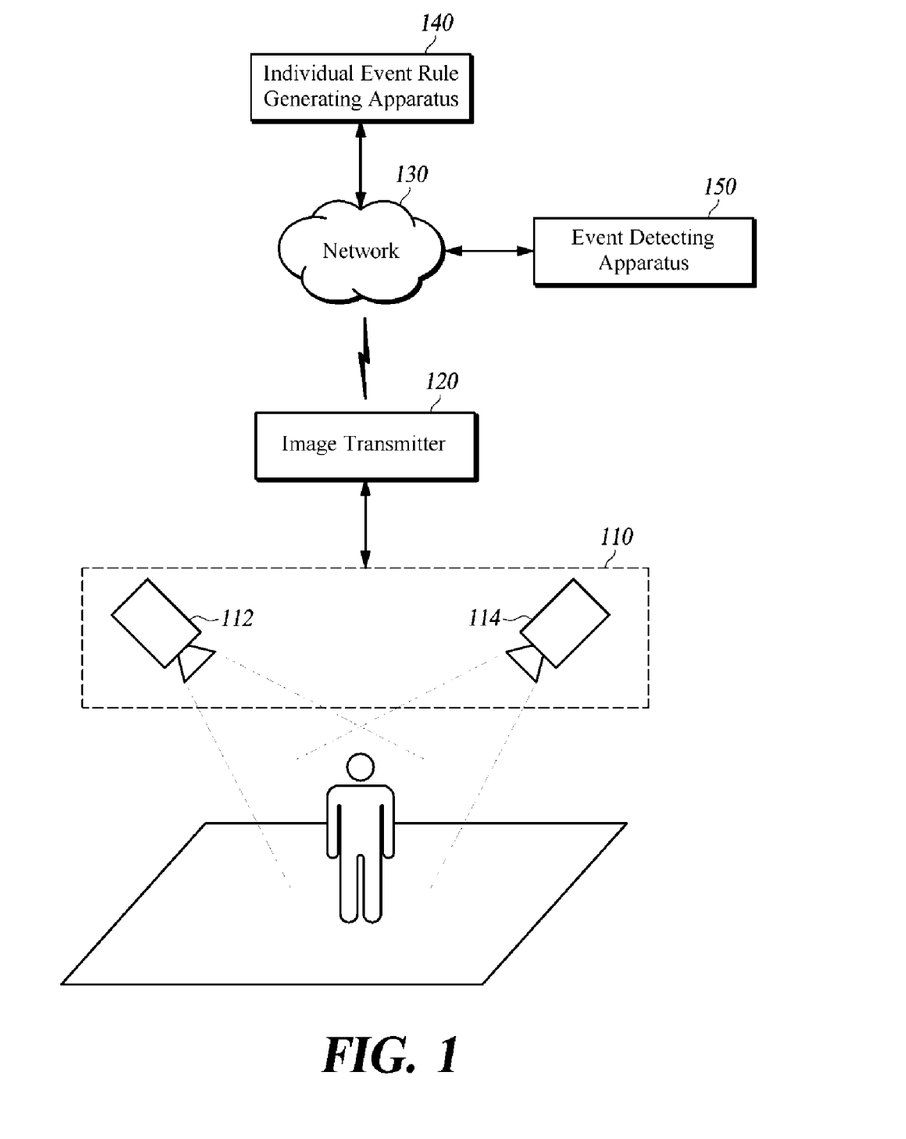
FIG. 1 is a schematic block diagram of an event detecting system according to some embodiments of the present disclosure.

FIG. 1 is a schematic block diagram of an event detecting system according to at least one embodiment of the present disclosure.

The event detecting system according to at least one embodiment of the present disclosure includes an image capture apparatus 110, an image transmitter 120, a network 130, an individual event rule generating apparatus 140 and an event detecting apparatus 150. The image capture apparatus 110 includes a first camera 112 and a second camera 114. Other components of the event detecting system, such as each of the image capture apparatus 110, the image transmitter 120, the individual event rule generating apparatus 140 and the event detecting apparatus 150 are implemented by, or includes, one or more processors and/or application-specific integrated circuits (ASICs). The event detecting system also comprises input units such as one or more buttons, a touch screen, a mic and so on, and output units such as a display, an indicator and so on.

The image capture apparatus 110 is a device for capturing images. The image capture apparatus 110 according to at least one embodiment of the present disclosure includes at least one camera of, for example, a closed circuit television (CCTV) camera, a security camera, a video surveillance camera etc. capable of capturing images in order to monitor an object as to whether some events, such as movement, intrusion, deviation, theft and being left unattended, are occurred with respect to the object. The captured image includes a plurality of frames captured by the multiple cameras 112 and 114.

The image capture apparatus 110 includes the multiple cameras such as the first camera 112 and the second camera 114 for capturing all or a part of an area of the same location in different directions. For example, when the image capture apparatus 110 captures a playground, the first camera 112 is able to be arranged to capture the left side of the playground and the second camera 114 is able to be arranged to capture the right side of the playground. Depending upon the various arrangement of both the first camera 112 and the second camera 114, there exists an overlapping region between images captured by the cameras 112 and 114.

The image transmitter 120 transmits the images captured by the image capture apparatus 110 including the multiple cameras to the individual event rule generating apparatus 140 and to the event rule detecting apparatus 150. Although the image transmitter 120 is illustrated as exchanging data of images and rules via the network 130, at least one embodiment of the present disclosure is not limited thereto, and the image transmitter 120 transmits and receives data via a network 130. Herein, the network 130 is capable of transmitting and receiving the data of the images and rules, and includes at least one of a local area communication network, a wide area communication network, wireless communication network corresponding to a communication base station installed by an operator, metropolitan area network and inter network to form an internetwork through device like routers gateways or bridges.

The individual event rule generating apparatus 140 receives the captured images from the image transmitter 120, generates a main image that is synthesized from the captured images by using predetermined conversion functions, and sets a pre-generated event rule for the main image. In addition, the individual event rule generating apparatus 140 processes the main image causing the event rule through the predetermined conversion function to generate a plurality of individual rule images. A, and the individual event rule generating apparatus 140 transmits both the event rule for the main image and individual event rules for the individual rule images to the event detecting apparatus 150.

The individual event rule generating apparatus 140 synthesizes the multiple captured images and generates a single main image through the predetermined conversion functions corresponding to coordinate systems of the cameras. The predetermined conversion functions are functions of a scheme such as homography and calibration for correcting a distorted image using coordinates system. The individual event rule generating apparatus 140 acquires an event rule for the synthesized main image. The event rule serves as a rule that is set up through a manager's manipulation with respect to the synthesized main image and it means conditional information for recognizing the occurrence of an event if there is an object-of-interest moving through a region-of-interest generated through a manager's setting command such as interface manipulation or coordinate input. A detailed description of the event rule will be given with reference to FIG. 2.

The individual event rule generating apparatus 140 converts the event rule for the main image into individual event rules corresponding respectively to the multiple cameras through the predetermined conversion functions corresponding to the coordinate systems of the cameras. For example, upon obtaining an event rule set to a circular shape of region-of-interest for the main image, the individual event rule generating apparatus 140 converts the left half circle of the region-of-interest into a first individual event rule through a conversion function corresponding to the first camera 112 and converts the right half circle of the region-of-interest into a second individual event rule through a conversion function corresponding to the second camera 114. For another exemplary main image with an event rule set to 'T' or T-shaped region-of-interest, the individual event rule generating apparatus 140 converts ']' or the left part of the T-shaped region-of-interest to the first individual event rule through the conversion function corresponding to the first camera 112 and converts '[' or the right part of the T-shaped region-of-interest to the second individual event rule through the conversion function corresponding to the second camera 114.

The event detecting apparatus 150 is adapted to receive the event rule and the individual event rules from the individual event rule generating apparatus 140 and detect an object-of-interest corresponding to an event.

The event detecting apparatus 150 according to at least one embodiment of the present disclosure is connected to the image transmitter 120 to receive the captured images. It receives the event rule and individual event rules from the individual event rule generating apparatus 140. Here, the event rule indicates a rule for the main image generated from the individual event rule generating apparatus 140 through a predetermined conversion function and the individual event rules indicate rules corresponding respectively to the cameras, which are converted through predetermined conversion functions corresponding to coordinate systems of the cameras.

The event detecting apparatus 150 compares pre-stored background images with the captured images, determines their difference as a moving object-of-interest, and extracts trace information of the object-of-interest. The trace information is expressed by a coordinate value, e.g., (x, y) at which the object-of-interest is located, but not restricted thereto. The trace information is a distance value from a predetermined starting point. That is, the distance value indicates trace information indicating a value of distance from the predetermined staring point to the moving object-of-interest in the captured images. In addition, the pre-stored background images are pre-captured by multiple cameras and they represent images indicating a still background for a predetermined time rather than the moving object-of-interest in the captured images.

Based on the individual event rules received from the individual event rule generating apparatus 140, the event detecting apparatus 150 is responsive to a change in the sign value of the trace information of the object-on-interest for identifying identifies the object-of-interest as an individual event passing through a region-of-interest according to the individual event rules. Although the individual event is an individual event in which the object-of-interest passes through a boundary line in the region-of-interest according to the individual event rules, at least one embodiment of the present disclosure is not necessarily limited thereto, and the individual event rule is an individual event of a trespassing on or an escape from the boundary region in the region-of-interest.

The event detecting apparatus 150 generates inversely converted trace information by using a predetermined conversion function from the trace information of the object-of-interest determined as the individual event. If multiple pieces of inversely converted trace information corresponding respectively to the multiple cameras comply with the event rule, the event detecting apparatus 150 identifies the inversely converted trace information as a single event. From the trace information of the object-of-interest identified as the individual event, the inversely converted trace information is generated through a conversion function such as homography and calibration for correcting a distorted image by using a coordinate system of a camera.

The event detecting apparatus 150 performs the operation of monitoring an event by displaying and/or alerting output information of the detected event. The event detecting apparatus 150 calculates statistical information of an event by using the output information for the detected event. The statistical information refers to information calculated through determining the number of occurrences of events such as a trespassing on, intrusion into and escape from the region-of-interest.

Figure 2:
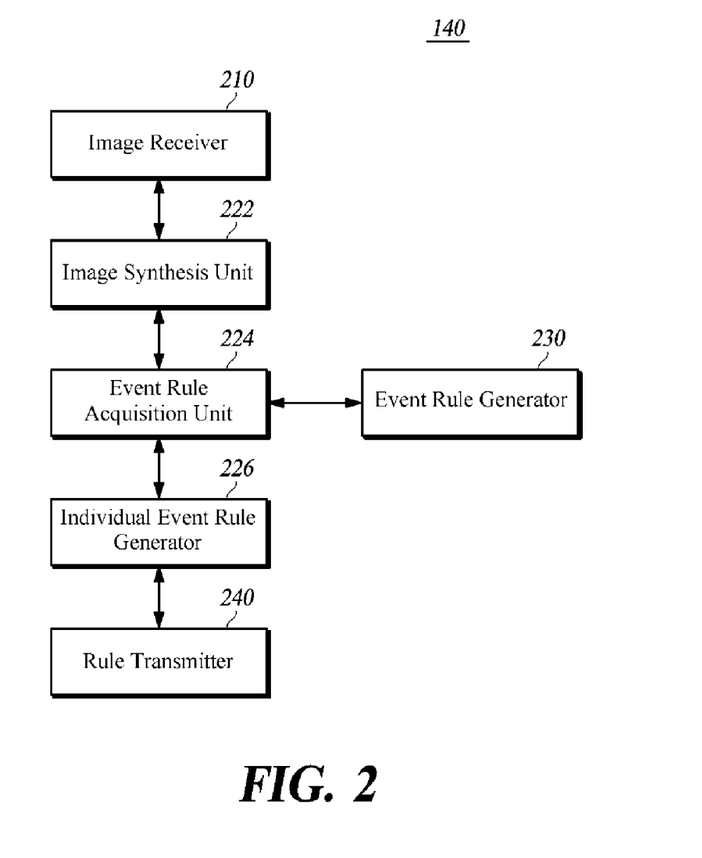
FIG. 2 is a schematic block diagram of an individual event rule generating apparatus according to some embodiments of the present disclosure.

FIG. 2 is a schematic block diagram of an individual event rule generator according to at least one embodiment of the present disclosure.

The individual event rule generating apparatus 140 according to at least one embodiment of the present disclosure includes an image receiver 210, an image synthesizer 222, an event rule acquisition unit 224, an individual event rule generator 226, an event rule generator 230 and a rule transmitter 240. Other components of the individual event rule generating apparatus 140, such as each of the image receiver 210, the image synthesizer 222, the event rule acquisition unit 224, the individual event rule generator 226, the event rule generator 230 and the rule transmitter 240 are implemented by, or includes, one or more processors and/or application-specific integrated circuits (ASICs). The individual event rule generating apparatus 140 comprises input units such as one or more buttons, a touch screen, a mic and so on, and output units such as a display, an indicator and so on The image receiver 210 is connected to the image transmitter 120 and receives captured images. The captured images refer to images captured by a plurality of cameras included in the image capture apparatus 110. A captured image is, but is not always limited to, one frame, or is an image composed of a combination of a plurality of frames.

The image synthesizer 222 generates a single main image by synthesizing the multiple captured images through predetermined conversion functions.

The image synthesizer 222 according to at least one embodiment of the present disclosure synthesizes the multiple captured images by using predetermined conversion functions corresponding to coordinate systems of the cameras to generate the single main image. The predetermined conversion functions are functions using a homography and calibration scheme for correcting a distorted image by using the coordinate systems. For example, when the first camera 112 and the second camera 114 capture the images of the same area in different directions, the image synthesizer 222 receives from the first camera 112 a captured image with a pedestrian located in the left side of the image, and receives from the second camera 114 a captured image with the pedestrian located in the right side of the image so as to generate a main image in which the passerby is centrally located through the predetermined conversion function.

The event rule acquisition unit 224 acquires an event rule for the main image from the event rule generator 230. The event rule is a rule that is set up through the manager's manipulation with respect to the synthesized main image from the captured images and it means conditional information for recognizing the occurrence of an event if there is an object-of-interest moving through a region-of-interest generated through a manager's setting command such as interface manipulation or coordinate input.

Upon obtaining the event rule for the initially synthesized main image from the image synthesizer 222, the event rule acquisition unit 224 acquires the event rule generated through a manager's setting command such as interface manipulation or coordinate input in the event rule generator 230. In addition, upon obtaining an event rule for the second or later synthesized main image from the image synthesizer 222, the event rule acquisition unit 224 acquires the pre-stored event rule for the initially synthesized main image in the event rule generator 230. For example, if a main image with a centrally positioned pedestrian is generated first, the event rule acquisition unit 224 acquires a manager's event rule set on an interface screen in the form of a circular region-of-interest encircling the pedestrian with a predetermined boundary reference value, and it acquires preset event rules for subsequently generated main images. Meanwhile, the event rule acquisition unit 224 acquires an event rule generated through the manager's interface manipulation or coordinate input if the region-of-interest or the boundary reference value of the event rule is changed or deleted.

Although the event rule acquisition unit 224 has been described as a separate module for acquiring an event rule from the event rule generator 230, at least one embodiment of the present disclosure is not necessarily restricted thereto, to consolidate the event rule acquisition unit 224 and the event rule generator 230 into one module for generating and storing the event rule through interface manipulation or coordinate input by the manager.

The individual event rule generator 226 converts the event rule for the main image into individual event rules through predetermined conversion functions. In more detail, the individual event rule generator 226 converts the event rule for the main image acquired from the event rule acquisition unit 224 into individual event rules corresponding respectively to the cameras through predetermined conversion functions corresponding to coordinate systems of the cameras. For example, upon acquisition of an event rule set to a circular shape of region-of-interest for the main image from the event rule acquisition unit 224, the individual event rule generator 226 converts the left semi-circle of the region-of-interest into a first individual event rule through a conversion function corresponding to the first camera 112 and convert the right semi-circle of the region-of-interest into a second individual event rule through a conversion function corresponding to the second camera 114.

The event rule generator 230 generates an event rule for detecting a moving object and transmits the generated event rule to the event rule acquisition unit 224. The event rule is a rule set through manipulation by a manager and means conditional information for recognizing the occurrence of an event if there is an object-of-interest moving through a region-of-interest generated through a manager's setting command such as interface manipulation or coordinate input.

The event rule generator 230 according to at least one embodiment of the present disclosure generates an event rule by using a region-of-interest generated through a manager's setting command such as interface manipulation or coordinate input and using a boundary reference value such as a distance value or a sign value set based on the region-of-interest. The event rule generator 230 generates the event rule only once through the manager's setting command when the main image is generated initially from the image synthesizer 222 and the event rule generator 230 transmits pre-generated event rule for the second or later synthesized main image to the event rule acquisition unit 224. The event rule generator 224 generates a new event rule when the setting command of the manager such as interface manipulation or coordinates input is input due to change or deletion of the region-of-interest or the boundary reference value.

The event rule generator 230 generates the region-of-interest and the boundary reference value for detecting an event. The region-of-interest is a region for detecting an event and refers to a figure including line segments, curves and closed curves. The boundary reference value refers to a distance value and a sign value which are set based on the region-of-interest. The distance value is set so as to be increased by 1 as the object-of-interest is separated from the boundary of the region-of-interest by a predetermined distance when the boundary of the region-of-interest is set to 0. The sign value is a value indicating whether the object-of-interest passes through the region-of-interest. And the sign value is, but is not limited to, '+' and '−'. For example, when an event for traffic volume of a road is monitored, specifically, when an event for vehicles passing from the left to the right of the region-of-interest is monitored, a sign value of the left side of the region-of-interest is set to '+' and a sign value of the right side of the region-of-interest is set to '−' so that the event for vehicles in which a sign value is changed from '+' to '−' or from '−' to '+' is detected.

The event rule generator 230 changes an event rule according to characteristics of an event to be monitored through manipulation by a manager. For example, in the case in which the event rule generator 230 sets a region-of-interest through input by the manager and generates an event rule for detecting all events for an object-of-interest passing through the set region-of-interest, when a distance value of the object-of-interest is greater than a predetermined threshold value and a sign value is changed from '+' to '−' or from '−' to '+' based on the preset region-of-interest and the boundary reference value, the event rule generator 230 sets an event rule for determining this as an event. Meanwhile, the event rule is set such that the case in which the distance value of the object-of-distance is less than the predetermined threshold value is not an event regardless of change of the sign value. Such an event rule is set in order to prevent the case in which the object-of-interest approximating to a predetermined distance of the region-of-interest enters or deviates from the region-of-interest from being determined as an event. Although the event rule has been described as detecting the object-of-interests corresponding to an event using both the predetermined distance value and the sign value, at least one embodiment of the present disclosure is not necessarily limited thereto and the event rule detects the event only with the change of the sign value.

The rule transmitter 240 transmits the event rule for the main image acquired from the event rule acquisition unit 224 and the individual event rules generated from the individual event rule generator 226 to the event detecting apparatus 150 so as to detect an object-of-interest corresponding to an individual event rule and determine whether the detected object-of-interest is an object-of-interest for the same event based on the event rule.

Figure 3:
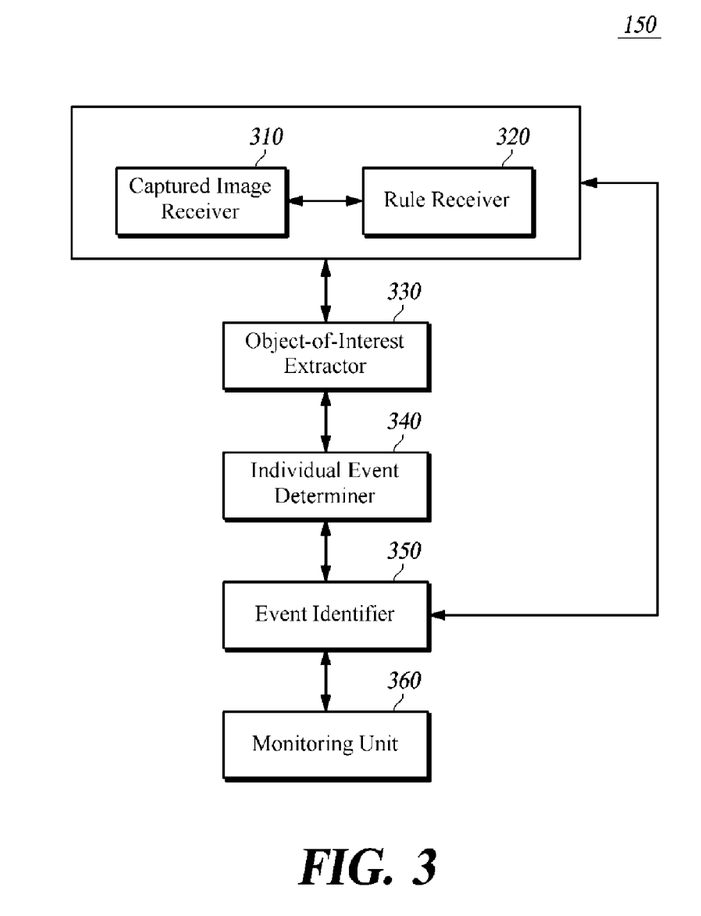
FIG. 3 is schematic block diagram of an event detecting apparatus according to some embodiments of the present disclosure.

FIG. 3 is schematic block diagram of an event detecting apparatus according to at least one embodiment of the present disclosure.

The event detecting apparatus 150 according to at least one embodiment of the present disclosure includes a captured image receiver 310, a rule receiver 320, an object-of-interest receiver 330, an individual event determiner 340, an event identifier 350 and a monitoring unit 360. Other components of the event detecting apparatus 150, such as each of the captured image receiver 310, the rule receiver 320, the object-of-interest receiver 330, the individual event determiner 340, the event identifier 350 and the monitoring unit 360 are implemented by, or includes, one or more processors and/or application-specific integrated circuits (ASICs).

The captured image receiver 310 is connected to the image transmitter 120 and receives captured images. The captured images are images captured by a plurality of cameras included in the image capture apparatus 110 and represent captured images corresponding respectively to the multiple cameras. A captured image is composed of, not necessarily limited thereto, a single captured frame, or the captured image is an image composed of a combination of a plurality of frames.

The rule receiver 320 receives an event rule and individual event rules from the individual event rule generating apparatus 140. The event rule indicates an event rule for a main image generated through a predetermined conversion function in the individual event rule generating apparatus 140 and the individual event rules indicate rules corresponding respectively to the cameras, which are converted from the event rule through predetermined conversion functions corresponding to coordinate systems of the cameras in the individual event rule generating apparatus 140.

The object-of-interest receiver 330 compares pre-stored background images with the captured images and determines a different part therebetween as a moving object-of-interest, thereby extracting trace information of an object-of-interest. The trace information is expressed by a coordinate value (e.g. (x, y)) at which the object-of-interest is located, but not restricted thereto. And the trace information is a distance value from a predetermined reference. The pre-stored background images are background images captured by the multiple cameras and represent images indicating a still background for a predetermined time rather than the moving object-of-interest in the captured images. The trace information of the object-of-interest extracted from the object-of-interest receiver 330 is used for the individual event determiner 340 to determine whether the object-of-interest corresponds to an individual event, based on the individual event rules.

The individual event determiner 340 determines whether the object-of-interest generated from the individual event determiner 340 corresponds to an individual event, based on the individual event rules. In more detail, the individual event determiner 340 checks whether the sign value of the trace information of the object-of-interest is changed, based on the individual event rules and determines whether the object-of-interest generates an individual event in which the object-of-interest passes through a region-of-interest according to the individual event rules. Although the individual event is an individual event in which the object-of-interest passes through a boundary line of the region-of-interest according to the individual event rules, at least one embodiment of the present disclosure is not necessarily limited thereto, and the individual event is an individual event for intrusion into or deviation from the boundary region of the region-of-interest. For example, in the case in which the region-of-interest for the individual event rule is set to a vertical boundary line in the center of an image and sign values of the left side and the right side of the boundary line based on the vertical boundary line are set to '+' and '−', respectively, if a rule for an event for recognizing an object-of-interest passing to the right from the left of the boundary line as an individual event, the individual event determiner 340 extracts trace information of a moving object-of-interest from the captured images and identifies an object-of-interest in which the sign value of the trace information is changed from '+' to '−' as the individual event.

The event identifier 350 generates inversely converted trace information through a predetermined conversion function from the trace information of the object-of-interest identified as the individual event by the individual event determiner 340. If multiple pieces of inversely converted trace information corresponding respectively to the cameras satisfy the event rule, the event identifier 350 identifies the inversely converted trace information as a single event. The trace information of the object-of-interest identified as the individual event is converted into the inversely converted trace information through a conversion function such as homography and calibration for correcting a distorted image using a coordinate system of a camera.

For example, if a first object-of-interest determined based on a first individual event rule having a region-of-interest of ']' in the first camera 112 and a second object-of-interest determined based on a second individual event rule having a region-of-interest of '[' in the second camera 114 are determined in the individual event determiner 340, the event identifier 350 generates first inversely converted information through a predetermined conversion function from trace information of the first object-of-interest and generates second inversely converted trace information through a predetermined conversion function from trace information of the second object-of-interest. The event identifier 350 identifies the first inversely converted trace information and the second inversely converted trace information as one event based on an event rule having a region-of-interest of 'T'.

The monitoring unit 360 monitors the event by displaying and alerting output information of the event identified from the event identifier 350. Although the monitoring unit 360 is shown in FIG. 3 as being included in the event detecting apparatus 150, at least one embodiment of the present disclosure is not necessarily restricted thereto, and the monitoring unit 360 is implemented by a separate device connected to the event detecting apparatus 150 via local area communication such as a wireless LAN signal, Bluetooth, or ZigBee.

The monitoring unit 360 calculates statistical information of an event using output information of the detected event. The statistical information refers to information calculated through the number of occurrences of events in which the object-of-interest passes through, intrudes into and deviates from the region-of-interest. For example, the monitoring unit 360 calculates statistical information of events such as the number of customers visiting a store, traffic volume passing through a road, or the number of people passing through a predetermined area.

Figure 4:
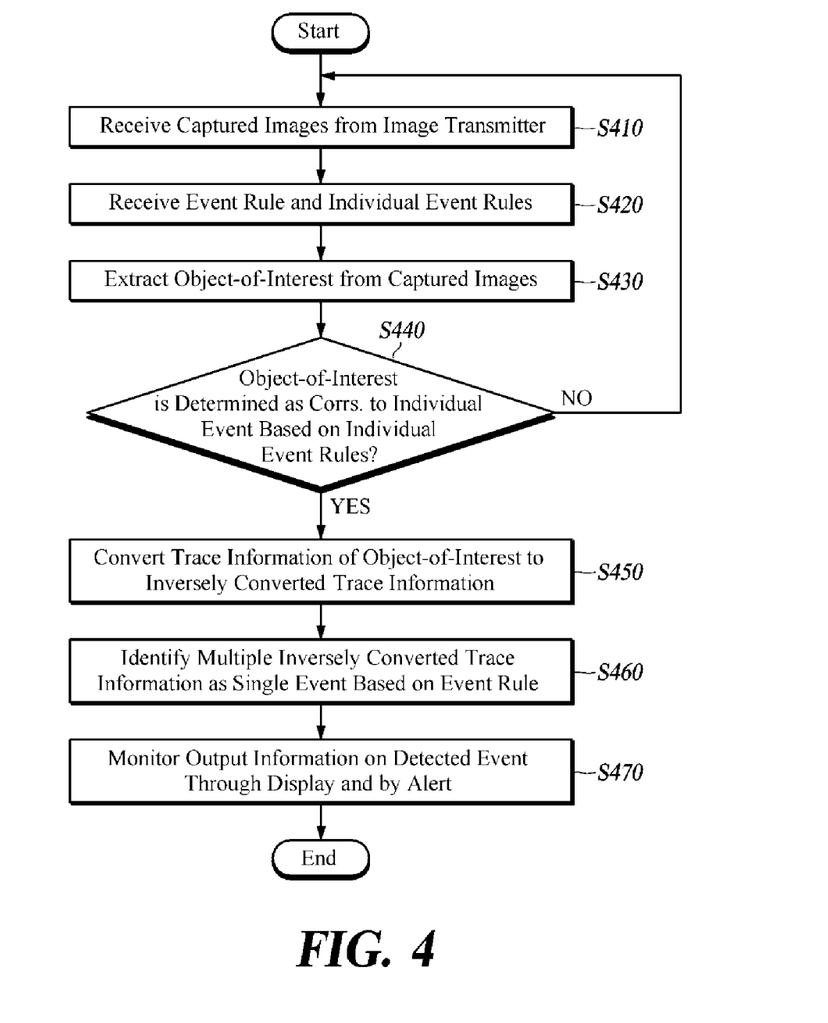
FIG. 4 is a flowchart of a method performed by an event detecting apparatus for detecting an event according to some embodiments of the present disclosure.

FIG. 4 is a flowchart of a method performed by an event detecting apparatus for detecting an event, according to at least one embodiment of the present disclosure.

The event detecting apparatus 150 receives, from the image transmitter 120, images captured from the image capture apparatus 110 (S410). The image capture apparatus 110 is implemented as multiple cameras and the event detecting apparatus 150 acquires a plurality of images captured respectively by the multiple cameras.

The event detecting apparatus 150 receives an event rule and individual event rules from the individual event rule generating apparatus 140 (S420). The event rule means an event rule for a main image generated through a predetermined conversion function in the individual event rule generating apparatus 140 and the individual event rules indicate rules corresponding respectively to the multiple cameras, which are converted through predetermined conversion functions corresponding to coordinate systems of the cameras.

The event detecting apparatus 150 extracts an object-of-interest from the captured images (S430). The event detecting apparatus 150 compares pre-stored background images with the captured images and determines a different part therebetween as a moving object-of-interest, thereby extracting trace information of the object-of-interest. The trace information is expressed by a coordinate value (e.g. (x, y)) at which the object-of-interest is located, but not restricted thereto. And the trace information is a distance value from a predetermined reference. The pre-stored background images are background images pre-captured by the multiple cameras and represent images indicating a still background for a predetermined time rather than a moving object-of-interest in the captured images.

The event detecting apparatus 150 determines whether the object-of-interest corresponds to an individual event based on the individual event rules received in Step S420 (S440). The event detecting apparatus 150 determines whether the object-of-interest generates an individual event in which the object-of-interest passes through a region-of-interest by confirming whether a sign value of the trace information of the object-of-interest is changed based on the individual event rules. For example, in the case in which a region-of-interest for an individual event rule is set to a vertical boundary line in the center of an image and sign values of the left side and the right side of the boundary line based on the vertical boundary line are set to '+' and '−', respectively, if the individual event rule is a rule for recognizing an object-of-interest passing to the right from the left of the boundary line as the individual event, the event detecting apparatus 150 extracts trace information of a moving object-of-interest from the captured images and identify an object-of-interest in which the sign value for the trace information is changed from '+' to '−' as an individual event.

If the object-of-interest corresponds to the individual event, the event detecting apparatus 150 generates inverse trace information through a predetermined conversion function from the trace information of the object-of-interest (S450). The inversely converted trace information is generated by inversely converting the trace information of the object-of-interest corresponding to the individual event through a conversion function such as homography and calibration for correcting a distorted image using a coordinate system of a camera.

If multiple pieces of inversely converted trace information comply with the event rule received in Step S420, the event detecting apparatus 150 identifies the object-of-interest as a single event (S460). If the inversely converted trace information is included in a region-of-interest based on a preset event rule and if it is determined that a sign value of the inversely converted trace information is changed, the event detecting apparatus 150 identifies the object-of-interest as an event.

The event detecting apparatus 150 performs monitoring by displaying and alerting output information for the detected event (S470).

Although Steps S410 to S470 of FIG. 4 have been described as being sequentially performed, this is only an exemplary description of the technical idea of at least one embodiment of the present disclosure. Those skilled in the art will appreciate that various modifications, additions and substitutions are possible, without departing from the characteristics of at least one embodiment of the present disclosure. For example, the order of steps shown in FIG. 4 is able to be changed, or one or more of Steps S410 to S470 are able to be performed in parallel. Therefore, the present disclosure is not limited to the time-series order as shown in FIG. 4.

Figure 5:
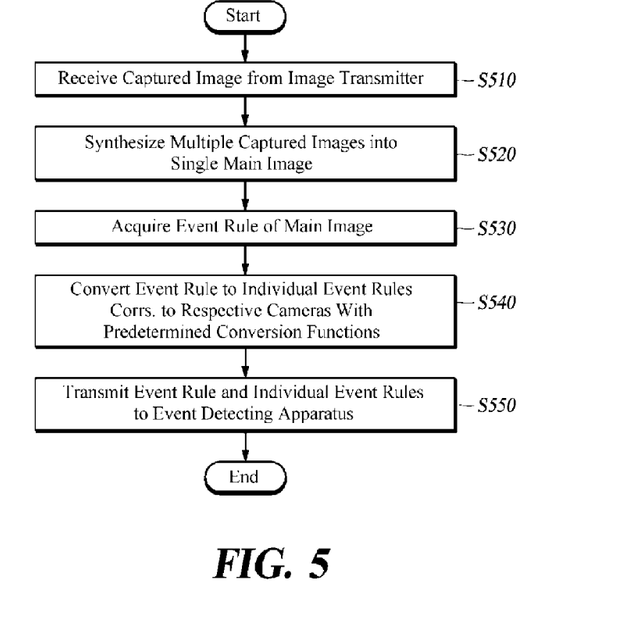
FIG. 5 is a flowchart of a method performed by an individual event rule generating apparatus for generating an individual event rule according to some embodiments of the present disclosure.

FIG. 5 is a flowchart of a method performed by an individual event rule generating apparatus for generating an individual event rule according to at least one embodiment of the present disclosure.

The individual event rule generator 140 receives, from the image transmitter 120, images captured from the image capture apparatus 110 (S510). The image capture apparatus 110 includes a plurality of cameras and the individual event rule generator 140 acquires a plurality of captured images captured respectively by the cameras.

The individual event rule generator 140 synthesizes the captured images into one main image through predetermined conversion functions corresponding to coordinate systems of the cameras (S520). The predetermined conversion functions are functions using a homography and calibration scheme for correcting a distorted image using the coordinate system.

The individual event rule generating apparatus 140 acquires an event rule for the main image (S530). The event rule is a rule set through manipulation of a manager for the main image in which the captured images are synthesized and means conditional information for recognizing operation in which an object-of-interest passes through a region-of-interest generated through a setting command of a manager such as interface manipulation or coordinate input as an event.

The individual event rule generating apparatus 140 converts an event rule for the main image into individual event rules corresponding respectively to the cameras using the predetermined conversion functions corresponding to the coordinate systems of the cameras (S540). For example, if an event rule set as a region-of-interest in the form of a circle in the main image is acquired, the individual event rule generating apparatus 140 converts the left semi-circle of the region-of-interest into a first individual event rule through a conversion function corresponding to the first camera 112 and convert the right semi-circle of the region-of-interest into a second individual event rule through a conversion function corresponding to the second camera 114.

The individual event rule generating apparatus 140 transmits the event rule for the main image and the individual event rules to the event detecting apparatus 150 in order to detect an object-of-interest corresponding to an event (S550).

Although Steps S510 to S550 of FIG. 5 have been described as being sequentially performed, this is only an exemplary description of the technical idea of at least one embodiment of the present disclosure. Those skilled in the art will appreciate that various modifications, additions and substitutions are possible, without departing from the spirit and scope of the claimed invention. For example, the order of steps shown in FIG. 5 is able to be changed, or one or more of Steps S510 to S550 are able to be performed in parallel. Therefore, the present disclosure is not limited to the time-series order as shown in FIG. 5.

According to some embodiments of the present disclosure as described above, a single event is detected from multiple captured images, by converting an event rule for a synthesized image from the multiple captured images through conversion functions corresponding to the coordinate systems of multiple cameras into individual event rules as a basis for determining multiple individual events, and identifying the determined multiple individual events through the predetermined conversion functions as the single event. Therefore, multiple event rules need not be set, repeated events are not detected, and events can be easily stored, identified and managed.

Although exemplary embodiments of the present disclosure have been described for illustrative purposes, those skilled in the art will appreciate that various modifications, additions and substitutions are possible, without departing from the spirit and scope of the claimed invention. Specific terms used in this disclosure and drawings are used for illustrative purposes and not to be considered as limitations of the present disclosure. Therefore, exemplary embodiments of the present disclosure have been described for the sake of brevity and clarity. Accordingly, one of ordinary skill would understand that the scope of the claimed invention is not limited by the explicitly described above embodiments but by the claims and equivalents thereof.

What is claimed is:

1. An event detecting apparatus, comprising:
   an image receiver, implemented by one or more processors, configured to receive multiple captured images from multiple cameras;
   a rule receiver, implemented by one or more processors, configured to receive
      an event rule as a basis for determining the presence or absence of a predetermined event from a synthesized image of the multiple captured images, and
      individual event rules which are converted from the event rule through conversion functions corresponding to coordinate systems of the multiple cameras;
   an object-of-interest extractor, implemented by one or more processors, configured to extract an object-of-interest from the captured images;
   an individual event determiner, implemented by one or more processors, configured to determine whether trace information of the object-of-interest corresponds to individual events based on the individual event rules;
   an event identifier, implemented by one or more processors, configured to
      generate inversely converted trace information from the trace information of the object-of-interest through the conversion functions,
      determine whether multiple pieces of the inversely converted trace information comply with the event rule, and
      when the multiple pieces of the inversely converted trace information comply with the event rule, identify the object-of-interest as a single event; and
   an event output unit, implemented by one or more processors, configured to generate output information according to the identified single event.

2. The event detecting apparatus of claim 1, wherein the object-of-interest extractor is configured to extract the object-of-interest by comparing background images pre-captured from the multiple cameras with the captured images.

3. The event detecting apparatus of claim 1, wherein
   the individual event determiner is configured to detect the object-of-interest using the individual event rules converted from the event rule, each individual event rule having a predetermined distinction for the corresponding camera, and
   the event identifier is configured to identify the object-of-interest as an individual event when a sign value of the trace information is changed.

4. The event detecting apparatus of claim 1, wherein the event identifier is configured to identify the object-of-interest as an event passing through a predetermined region-of-interest when a sign value of the inversely converted trace information is changed based on the event rule in which the predetermined region-of-interest and a sign value are set.

5. An event detecting method, comprising:
   receiving multiple captured images from multiple cameras;
   receiving
      an event rule as a basis for determining the presence or absence of a predetermined event from a synthesized image of the multiple captured images, and
      individual event rules which are converted from the event rule through conversion functions corresponding to coordinate systems of the multiple cameras;
   extracting an object-of-interest from the captured images;
   determining an individual event by determining whether trace information of the object-of-interest corresponds to individual events based on the individual event rules;
   performing event identification, comprising:
      generating an inversely converted trace information from the trace information of the object-of-interest through the conversion functions,
      determining whether multiple pieces of the inversely converted trace information comply with the event rule, and
      when the multiple pieces of the inversely converted trace information comply with the event rule, identifying the object-of-interest as a single event; and
   performing event output by generating output information according to the identified single event.

* * * * *